United States Patent [19]

Jost

[11] 4,341,896
[45] Jul. 27, 1982

[54] 1-HYDROXY-4-HETEROARYLAMINOAN-THRAQUINONES

[75] Inventor: Max Jost, Oberwil, Switzerland

[73] Assignee: Ciba-Geigy Corporation, Ardsley, N.Y.

[21] Appl. No.: 151,224

[22] Filed: May 19, 1980

[30] Foreign Application Priority Data

May 30, 1979 [CH] Switzerland .................. 5035/79

[51] Int. Cl.³ ............... C07D 271/10; C07D 263/56; C07D 277/66; C08L 67/00
[52] U.S. Cl. ........................ 548/143; 260/326 D; 260/326.5 FM; 548/152; 548/224; 524/83; 524/94; 524/104; 524/95
[58] Field of Search ................ 548/143, 152, 224; 260/326 D, 326.5 FM

[56] References Cited

U.S. PATENT DOCUMENTS

| | | | |
|---|---|---|---|
| 2,741,621 | 4/1956 | Moergeli et al. | 548/143 |
| 3,184,455 | 5/1965 | Neeff | 260/243 |
| 3,380,955 | 4/1968 | Cross et al. | 260/343.45 |
| 3,867,406 | 2/1975 | Schwantje | 260/326 D |

FOREIGN PATENT DOCUMENTS 1429358 1/1966 France .
1409941 10/1975 United Kingdom .

OTHER PUBLICATIONS

Berg, et al., "C.A.", vol. 73, (1970), 4948r.

Primary Examiner—Anton H. Sutto
Attorney, Agent, or Firm—Luther A. R. Hall

[57] ABSTRACT

1-Hydroxy-4-heteroarylaminoanthraquinones of the formula

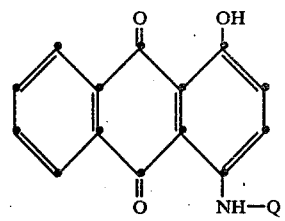

wherein Q is for example one of the two groups of the formulae

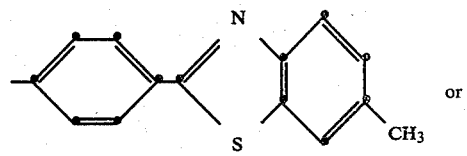

or

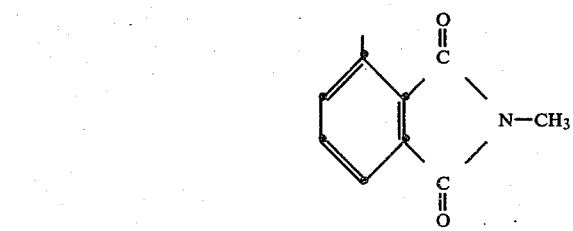

are most suitable for the mass coloration of polyester. They are distinguished in particular by good lightfastness and purity of shade. Further definitions of Q will be found in claim 1.

7 Claims, No Drawings

1-HYDROXY-4-HETEROARYLAMINOAN-THRAQUINONES

The present invention relates to novel 1-hydroxy-4-heteroarylaminoanthraquinones for the mass colouration of polyester.

1-Hydroxy-4-phenylaminoanthraquinones which can be used for the mass colouration of polyester are known from British Pat. No. 1,409,941. However, the blue to violet colourations obtained with these compounds are not entirely satisfactory as regards lightfastness and purity of shade.

There have now been found novel 1-hydroxy-4-heteroarylaminoanthraquinones which are distinguished by surprisingly good lightfastness and purity of shade in the mass colouration of polyester.

Accordingly, the invention provides 1-hydroxy-4-heteroarylaminoanthraquinones of the formula I

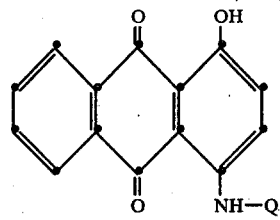

(I)

wherein Q is a group of the formula II

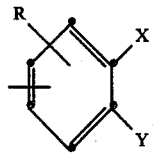

(II)

wherein R is hydrogen, halogen, $C_1$-$C_4$alkyl, $C_1$-$C_4$alkoxy, X is one of the heterocyclic radicals of the formulae

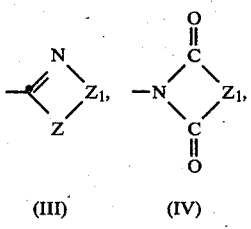

(III)         (IV)

wherein Z is —O— or —S—, $Z_1$ is ethylene, vinylene, o-phenylene which is unsubstituted or substituted by halogen, $C_1$-$C_4$alkyl, $C_1$-$C_4$alkoxy, —$SO_2CH_3$ or —$SO_2NH_2$, or is a —$C(R_1)$=N— group which is linked to Z through the carbon atom, and $R_1$ is hydrogen, $C_1$-$C_4$alkyl or phenyl, Y is hydrogen or X and Y together with the benzene ring to which they are attached form a heterocyclic system of the formula V

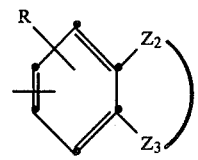

(V)

wherein R has the above meaning, $Z_2$ is —O— or —CO—, and, if $Z_2$ is —O—, $Z_3$ is a group —N=C(R$_1$)— which is linked to $Z_2$ through the carbon atoms, and, if $Z_2$ is —CO—, is a group —CO—N(R$_1$)— which is linked to $Z_2$ through the nitrogen atom.

Halogen denotes in particular chlorine or bromine. $C_1$-$C_4$Alkyl is e.g. methyl, ethyl, n-propyl, isopropyl, n-butyl or tert-butyl, with methyl being the preferred identity.

$C_1$-$C_4$Alkoxy is e.g. methoxy, ethoxy, n-propoxy, isopropoxy, n-butoxy or tert-butoxy. Methoxy is preferred.

Examples of heterocyclic radicals of the formula III are those of the formulae

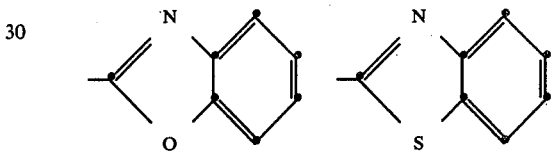

and their derivatives which are substituted in the phenyl nucleus by halogen, $C_1$-$C_4$alkyl, $C_1$-$C_4$alkoxy, —$SO_2CH_3$ or —$SO_2NH_2$, or those of the formulae

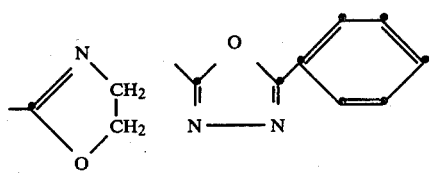

Examples of heterocyclic systems of the formula V are those of the formulae

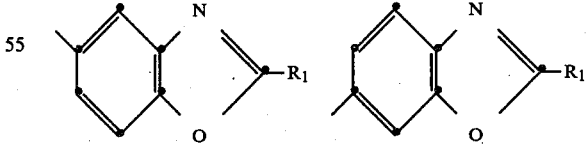

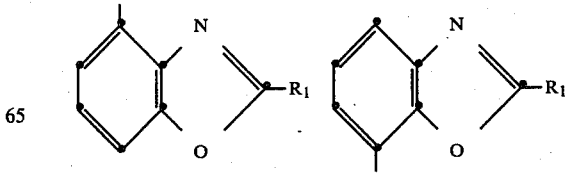

-continued

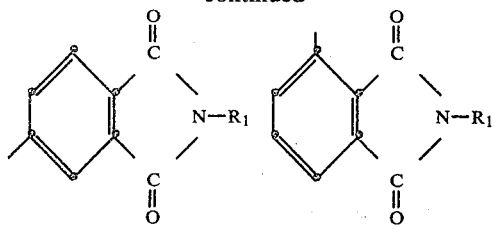

and their derivatives which are substituted in the phenyl nucleus by halogen, $C_1$–$C_4$alkyl or $C_1$–$C_4$alkoxy. In the above formulae, $R_1$ is as previously defined herein.

Interesting anthraquinones of the formula I are those wherein Q is a group of the formula VI

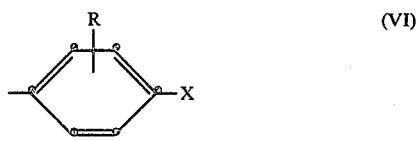

(VI)

wherein R and X are as defined above.

Especially interesting anthraquinones of the formula I are those wherein Q is a group of the formula VII

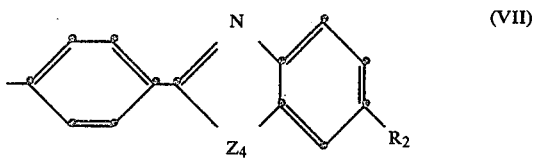

(VII)

wherein $Z_4$ is —O— or —S— and $R_2$ is hydrogen or $C_1$–$C_4$alkyl, especially methyl.

The most preferred anthraquinone is the 1-hydroxy-4-heteroarylaminoanthraquinone of the formula I, wherein Q is a radical of the formula

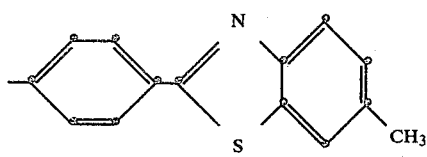

The 1-hydroxy-4-heteroarylaminoanthraquinones of the present invention can be obtained by known methods, preferably by reacting a mixture of 1,4-dihydroxyanthraquinone and 1,4-dihydroxy-2,3-dihydroanthraquinone in the molar ratio of 3.8 to 4.2:1.2 to 8.0, in the presence of boric acid and solvent, in the temperature range from 70° to 100° C., with an amine of the formula Q-NH$_2$, wherein Q is as defined above. Further known preparatory methods comprise starting from 1-hydroxy-4-aminoanthraquinone, by reaction either with a chlorine or bromine derivative of the formula Q-Cl or Q-Br respectively, in nitrobenzene, in the temperature range from 180° to 210° C., in the presence of copper(I) chloride and sodium carbonate, or with an amine of the formula Q-NH$_2$ in alcoholic solution with simultaneous reduction, for example as described in Example 1 of German Auslegeschrift 1 644 620. All the starting materials are known per se.

The anthraquinones of the present invention are suitable for the mass colouration of linear polyesters.

Suitable linear polyesters are in particular those which are obtained by polycondensation of terephthalic acid or an ester thereof with a glycol of the formula HO—(CH$_2$)$_n$—OH, in which n is an integer from 2 to 10, or with 1,4-di(hydroxymethyl)cyclohexane, or by polycondensation of a glycol ether of a hydroxybenzoic acid, for example p-(β-hydroxyethoxy)benzoic acid. The term "linear polyesters" also comprises copolyesters which are obtained by partial replacement of terephthalic acid by another dicarboxylic acid and/or by partial replacement of the glycol by another diol.

The preferred linear polyesters, however, are polyethylene terephthalates.

Colouration is effected by the conventional methods, for example by mixing the colourants with the plastics material in granulate or particulate form and extruding the mixture to fibres, sheets or granulates. These latter can then be moulded to objects by injection moulding.

The colourants of the present invention can also be incorporated in those preparations for colouring polyester in the melt which are described in British Pat. No. 1,398,352.

Finally, the substance to be coloured can also be added direct to the polyester melt or before or during the polycondensation.

Depending on the desired colour strength, the ratio of colourant to polyester can vary within wide limits. In general, it is advisable to use 0.01 to 3 parts by weight of colourant per 100 parts by weight of polyester. Instead of individual colourants of the formula I, it is also possible to use mixtures thereof as well as mixtures thereof with other colourants.

The treated polyester particles are fused by known methods in an extruder and pressed to objects, especially sheets or filaments, or cast to boards.

The colourants of the formula I possess the necessary thermostability for colouring polyester in the melt and the colourations obtained are distinguished by surprisingly good lightfastness and purity of shade, as well as by good fastness to washing, dry cleaning, cross-dyeing, thermofixation and bleeding, good fastness to rubbing after thermofixation or after thermofixation and subsequent heat-setting, and by clear shades, good colour strength and brilliance.

The invention is illustrated by the following Examples, in which parts and percentages are by weight.

EXAMPLE 1

38.4 parts of 1,4-dihydroxyanthraquinone, 9.6 parts of 2,3-dihydro-1,4-dihydroxyanthraquinone, 57.5 parts of 2-(4'-aminophenyl)-6-methylbenzthiazole and 53.5 parts of boric acid are stirred in 400 parts of isopropanol for 20 hours at 80° to 82° C. The precipitated reaction product of the formula

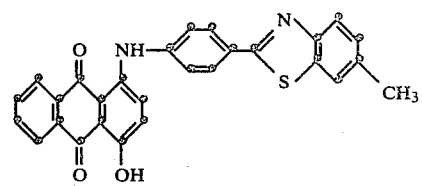

is collected by filtration, washed with isopropanol and also hot water and dried, affording 86 parts (93% of theory) of blue colourant. If necessary, the reaction product can be further purified, e.g. by boiling it in isopropanol.

EXAMPLE 2

An equivalent amount of 2-methyl-6-aminobenzoxazole is used instead of the base employed in Example 1, affording the blue colourant of the formula

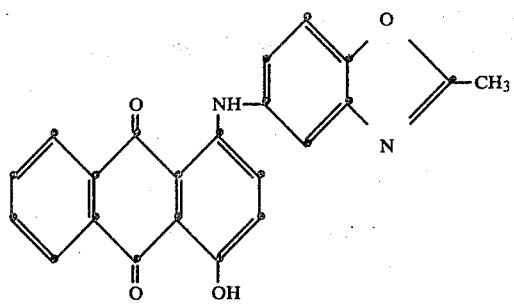

in a yield of 82%.

EXAMPLE 3

16.8 parts of 2-(4'-bromophenyl)-6-methylbenzthiazole, 12.0 parts of 1-amino-4-hydroxyanthraquinone and 8 parts of sodium carbonate are suspended in 240 parts of nitrobenzene. To the suspension is then added 0.6 part of copper(I) chloride at 190° C. The reaction mixture is stirred at 190°–195° C. until the starting material can no longer be detected. The reaction product is isolated from the cold reaction mixture by filtration, washed with a small amount of nitrobenzene, then with ethanol and hot water, and finally is boiled with dilute hydrochloric acid. After crystallisation from o-dichlorobenzene, the reaction product melts at 265°–267° C.; it corresponds to the colourant of Example 1.

EXAMPLE 4

A non-delustred polyethylene terephthalate granulate suitable for fibre manufacture is shaken in a closed vessel for 15 minutes on a mechanical shaker together with 1% of the colourant of Example 1. The uniformly coloured granules are then spun in a melt spinning machine (285° C.+3° C., sojourn time in the spinning machine about 5 minutes) to filaments, which are stretched and wound on a draw twister. The solubility of the colourant in polyethylene terephthalate results in a strong blue colouration which is distinguished by outstanding lightfastness, excellent fastness to washing, dry cleaning, cross-dyeing, sublimation and rubbing after thermofixation, and also by good viscosity values.

EXAMPLE 5

1000 parts of polyethylene terephthalate granules, 10 parts of titanium oxide (Kronus RN 40) and 1 part of finely divided colourant of Example 1 are mixed in a closed vessel for 2 hours on a roller gear table. The coloured granules are extruded at about 260° C. to strands of 2 mm, which are re-granulated. The resultant granules are processed at 270°–280° C. in a screw injection moulding machine to mouldings. The blue colouration obtained is of very good lightfastness. Polyester colourations of excellent properties are likewise obtained by using the colourants listed in the following table in accordance with Example 4:

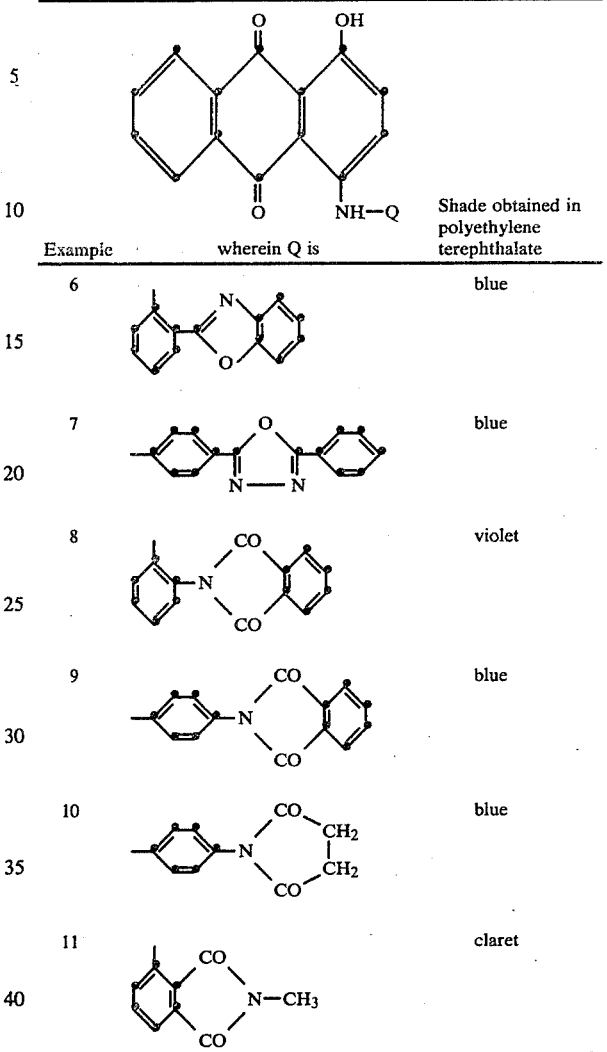

What is claimed is:

1. A 1-hydroxy-4-heteroarylaminoanthraquinone of the formula

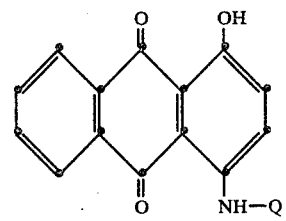

wherein Q is a group selected from the group consisting of

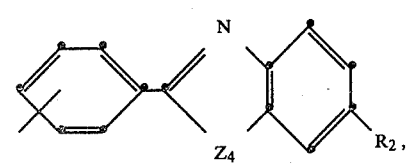

-continued

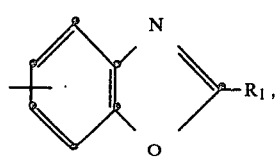

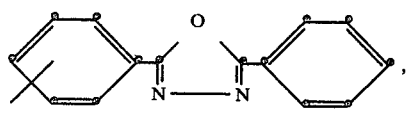

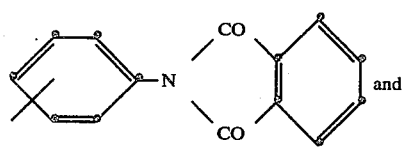

and

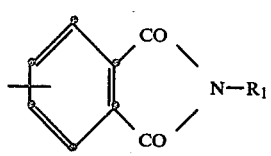

wherein $Z_4$ is —O— or —S—, $R_1$ is hydrogen, $C_{1-4}$-alkyl or phenyl, and $R_2$ is hydrogen or $C_{1-4}$-alkyl.

2. A 1-hydroxy-4-heteroarylaminoanthraquinone according to claim 1 of the formula I, wherein Q is a group of the formula VII

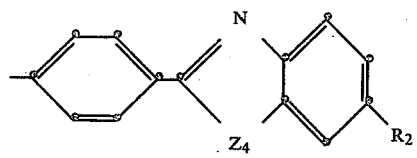

wherein $Z_4$ is —O— or —S—, and $R_2$ is hydrogen or $C_1$-$C_4$alkyl.

3. A 1-hydroxy-4-heteroarylaminoanthraquinone according to claim 1 of the formula I, wherein Q is a group of the formula VIII

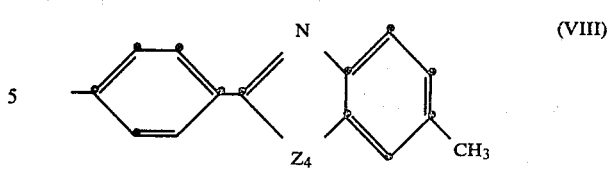

wherein $Z_4$ is —O— or —S—.

4. The dyestuff according to claim 1 of the formula

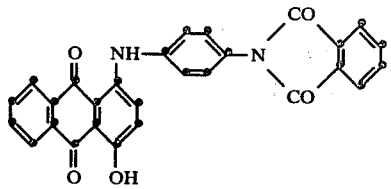

5. The dyestuff according to claim 1 of the formula

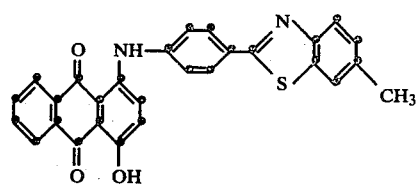

6. The dyestuff according to claim 1 of the formula

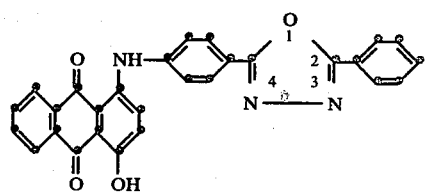

7. The dyestuff according to claim 1 of the formula

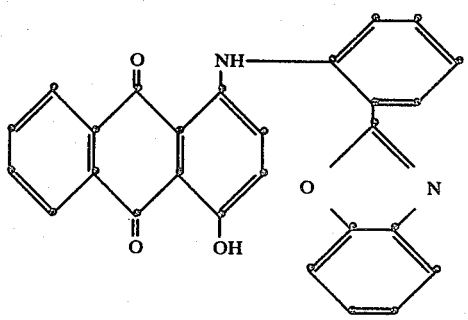

* * * * *